United States Patent
Suda et al.

(10) Patent No.: US 12,238,454 B2
(45) Date of Patent: Feb. 25, 2025

(54) COMMUNICATION DEVICE AND VIDEO TRANSMISSION SYSTEM

(71) Applicant: TOYOTA JIDOSHA KABUSHIKI KAISHA, Toyota (JP)

(72) Inventors: Rio Suda, Toyota (JP); Hirofumi Momose, Toyota (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/371,844

(22) Filed: Sep. 22, 2023

(65) Prior Publication Data

US 2024/0171703 A1 May 23, 2024

(30) Foreign Application Priority Data

Nov. 17, 2022 (JP) .................................. 2022-184035

(51) Int. Cl.
*H04N 7/12* (2006.01)
*H04N 7/08* (2006.01)

(52) U.S. Cl.
CPC ............... *H04N 7/127* (2013.01); *H04N 7/08* (2013.01)

(58) Field of Classification Search
CPC ............ H04N 7/127; H04N 7/08; H04N 7/18; G09G 5/006
See application file for complete search history.

(56) References Cited

U.S. PATENT DOCUMENTS

| 5,481,306 A | * | 1/1996 | Senso | H04N 9/7973 |
| | | | | 345/903 |
| 8,878,989 B2 | * | 11/2014 | Minamoto | H04N 5/073 |
| | | | | 348/383 |
| 11,215,982 B2 | | 1/2022 | Urano et al. | |
| 11,325,618 B2 | | 5/2022 | Umeda | |
| 2004/0028131 A1 | * | 2/2004 | Ye | H04N 19/187 |
| | | | | 375/E7.091 |
| 2007/0086519 A1 | * | 4/2007 | Lim | H04N 21/2662 |
| | | | | 375/240.1 |
| 2013/0057767 A1 | * | 3/2013 | Caillerie | H04N 7/063 |
| | | | | 348/E5.062 |
| 2019/0137999 A1 | | 5/2019 | Taguchi et al. | |
| 2020/0209888 A1 | | 7/2020 | Sakai et al. | |
| 2020/0326702 A1 | | 10/2020 | Iwamoto et al. | |
| 2021/0041894 A1 | | 2/2021 | Urano et al. | |
| 2021/0055741 A1 | | 2/2021 | Kawanai et al. | |
| 2021/0058173 A1 | | 2/2021 | Otaki et al. | |
| 2021/0072743 A1 | | 3/2021 | Otaki et al. | |
| 2021/0080943 A1 | | 3/2021 | Iwamoto et al. | |

FOREIGN PATENT DOCUMENTS

| JP | H0983603 A | * | 3/1997 | |
| JP | 5011575 B2 | | 8/2012 | |
| JP | 5299165 B2 | * | 9/2013 | |
| KR | 20140115662 A | * | 3/2013 | ............. H04H 20/33 |

* cited by examiner

*Primary Examiner* — Michael Lee
(74) *Attorney, Agent, or Firm* — Sughrue Mion, PLLC

(57) ABSTRACT

A communication device transmits a video to a reception-side device connected via N communication lines. N is an integer of 2 or more. The communication device includes a controller. The controller spatially separates an image of one frame into N separate images. Then, the controller transmits the N separate images to the reception-side device in parallel via the N communication lines, respectively.

3 Claims, 6 Drawing Sheets

1: VIDEO TRANSMISSION SYSTEM

COMMUNICATION DEVICE AND VIDEO TRANSMISSION SYSTEM

CROSS-REFERENCES TO RELATED APPLICATION

The present disclosure claims priority to Japanese Patent Application No. 2022-184035, filed on Nov. 17, 2022, the contents of which application are incorporated herein by reference in their entirety.

TECHNICAL FIELD

The present disclosure relates to a technique for transmitting a video.

BACKGROUND ART

Patent Literature 1 discloses a video data transmission device. The video data transmission device separately encodes basic frames and differential frames of a video. Then, the video data transmission device preferentially transmits the basic frames and transmits the differential frames when there is a margin in a communication bandwidth.

LIST OF RELATED ART

Patent Literature 1: Japanese Patent No. 5011575

SUMMARY

According to the technique disclosed in Patent Literature 1, when there is no margin in the communication bandwidth, only the basic frames are transmitted. In this case, continuity and real-time property of the video on the reception-side are degraded. This is not preferable from a viewpoint of utilization of the video on the reception-side.

An object of the present disclosure is to provide a video transmission technique capable of ensuring continuity of video on a reception-side.

A first aspect relates to a communication device that transmits a video to a reception-side device connected via N communication lines. N is an integer of 2 or more.

The communication device includes a controller. The controller spatially separates an image of one frame into N separate images. Then, the controller transmits the N separate images to the reception-side device in parallel via the N communication lines, respectively.

A second aspect relates to a video transmission system for transmitting a video.

The video transmission system includes a transmission-side device and a reception-side device connected to the transmission-side device via N communication lines. N is an integer of 2 or more.

The transmission-side device spatially separates an image of one frame into N separate images. Then, the transmission-side device transmits the N separate images to the reception-side device in parallel via the N communication lines, respectively.

The reception-side device generates a restored image by synthesizing one or more separate images received via the N communication lines within a reception period for the one frame.

According to the present disclosure, it is possible to ensure the continuity and the real-time property of the video on the reception-side while suppressing a communication cost.

DETAILED DESCRIPTION

Embodiments of the present disclosure will be described with reference to the accompanying drawings.

1. Overview of Video Transmission System

Figure 1:
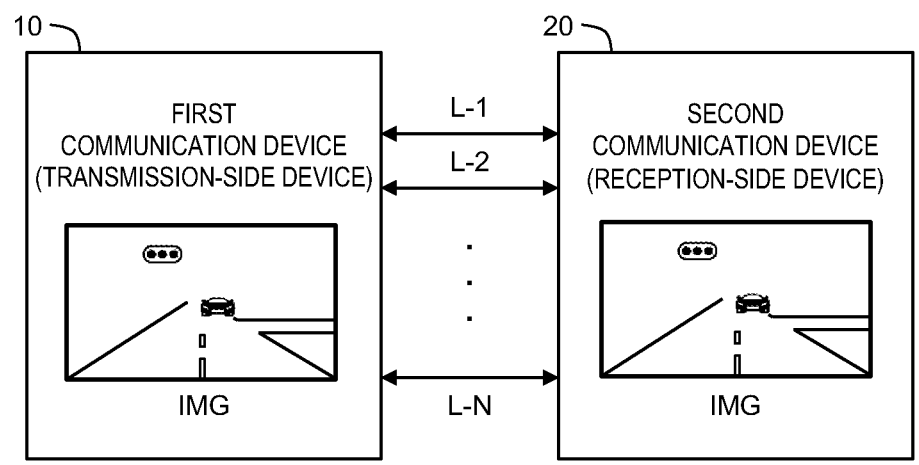
FIG. 1 is a conceptual diagram for explaining an overview of a video transmission system according to an embodiment.
Figure 1:
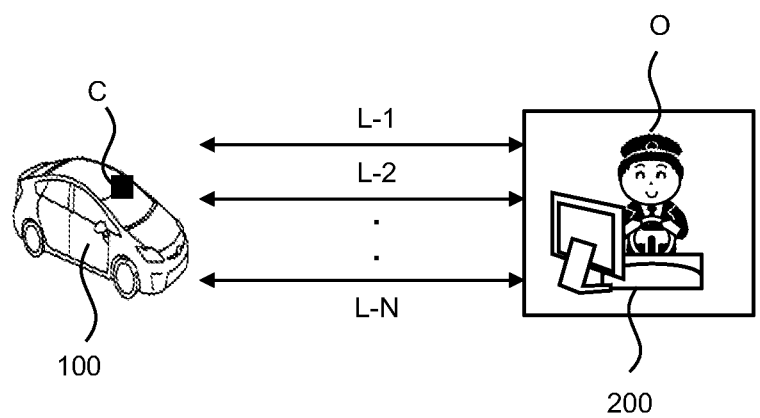

FIG. 1 is a conceptual diagram for explaining a video transmission system 1 according to the present embodiment. The video transmission system 1 includes a first communication device 10 (transmission-side device, transmitter) and a second communication device 20 (reception-side device, receiver). The first communication device 10 and the second communication device 20 are connected to each other via a communication network.

The first communication device 10 acquires a video to be transmitted. The video is composed of a plurality of images IMG (frames). The first communication device 10 transmits the video to the second communication device 20. The second communication device 20 receives the video transmitted from the first communication device 10. The video received by the second communication device 20 is used for a variety of purposes. For example, the video is displayed on a display device or the like to be presented to a user.

For example, the first communication device 10 is a moving body 100. Examples of the moving body 100 include a vehicle, a robot, a flying object, and the like. The vehicle may be an autonomous vehicle. Examples of the robot include a distribution robot, a work robot, and the like. Examples of the flying object include an airplane, a drone, and the like. The second communication device 20 is an external device outside the moving body 100.

As an example, a case where the moving body 100 is a target of remote support performed by a remote operator O will be considered. The remote support is a concept including a remote operation, remote monitoring, remote judgment, and the like. A remote operator terminal 200 is a terminal operated by the remote operator O for performing the remote support of the moving body 100. The moving body 100 corresponds to the first communication device 10, the remote operator terminal 200 corresponds to the second communication device 20, and the moving body 100 and the remote operator terminal 200 communicate with each other. A camera C is mounted on the moving body 100. The camera C acquires a video (image IMG) indicating a situation around the moving body 100. The moving body 100 transmits the video (image IMG) captured by the camera C to the remote operator terminal 200. The remote operator terminal 200 receives the video (image IMG) from the moving body 100 and displays the received video (image IMG) on a display device. The remote operator O views the video (image IMG) displayed on the display device, grasps the situation around the moving body 100, and performs the remote support of the moving body 100. An instruction from the remote operator O is sent from the remote operator terminal 200 to the moving body 100. The moving body 100 operates in accordance with the instruction from the remote operator O.

According to the present embodiment, the first communication device 10 and the second communication device 20 are connected to each other via a plurality of communication lines L-1 to L-N and can perform a communication by using the plurality of communication lines L-1 to L-N. Here, N is an integer equal to or greater than 2. The communication line can be rephrased as a communication carrier. The communication carrier or a communication scheme may be different for each communication line L. Examples of the communication scheme include a common cellular method provided by MNO (Mobile Network Operator), an inexpensive cellular method provided by MVNO (Mobile Virtual Network Operator), a wireless LAN (Local Area Network) method, and the like.

The first communication device 10 is able to transmit the images IMG to the second communication device 20 via the N communication lines L-1 to L-N. Even if a breakdown in a part of the communication lines L-1 to L-N occurs, it is possible to transmit the images IMG via the other available communication line. Therefore, robustness of the video transmission is improved. In addition, continuity and real-time property of the video on the reception-side are ensured. These are preferable from a viewpoint of utilization of the video on the reception-side.

How to transmit the images IMG of one frame using the N communication lines L-1 to L-N has a room for further investigation.

First, let us consider "redundant image transmission" as a comparative example. In the case of the redundant image transmission, the first communication device 10 duplicates an entire image IMG of one frame and transmits the N same images IMG via the N communication lines L-1 to L-N, respectively. The second communication device 20 receives the same images IMG from the N communication lines L-1 to L-N. Even if a breakdown in a part of the communication lines L-1 to L-N occurs, the image IMG can be transmitted to the second communication device 20 via another communication line. Accordingly, the above-described technical effects can be obtained. However, the second communication device 20 adopts the image IMG received first and discards the other images IMG received later. The transmission of the discarded images IMG is resultantly wasteful. Therefore, demerits of the redundant image transmission include an increase in communication cost.

In view of the above, the present embodiment provides a video transmission technique capable of ensuring continuity and real-time property of the video on the reception-side while suppressing a communication cost. The video transmission technique is "separate image transmission" which will be described below.

2. Separate Image Transmission

Figure 2:
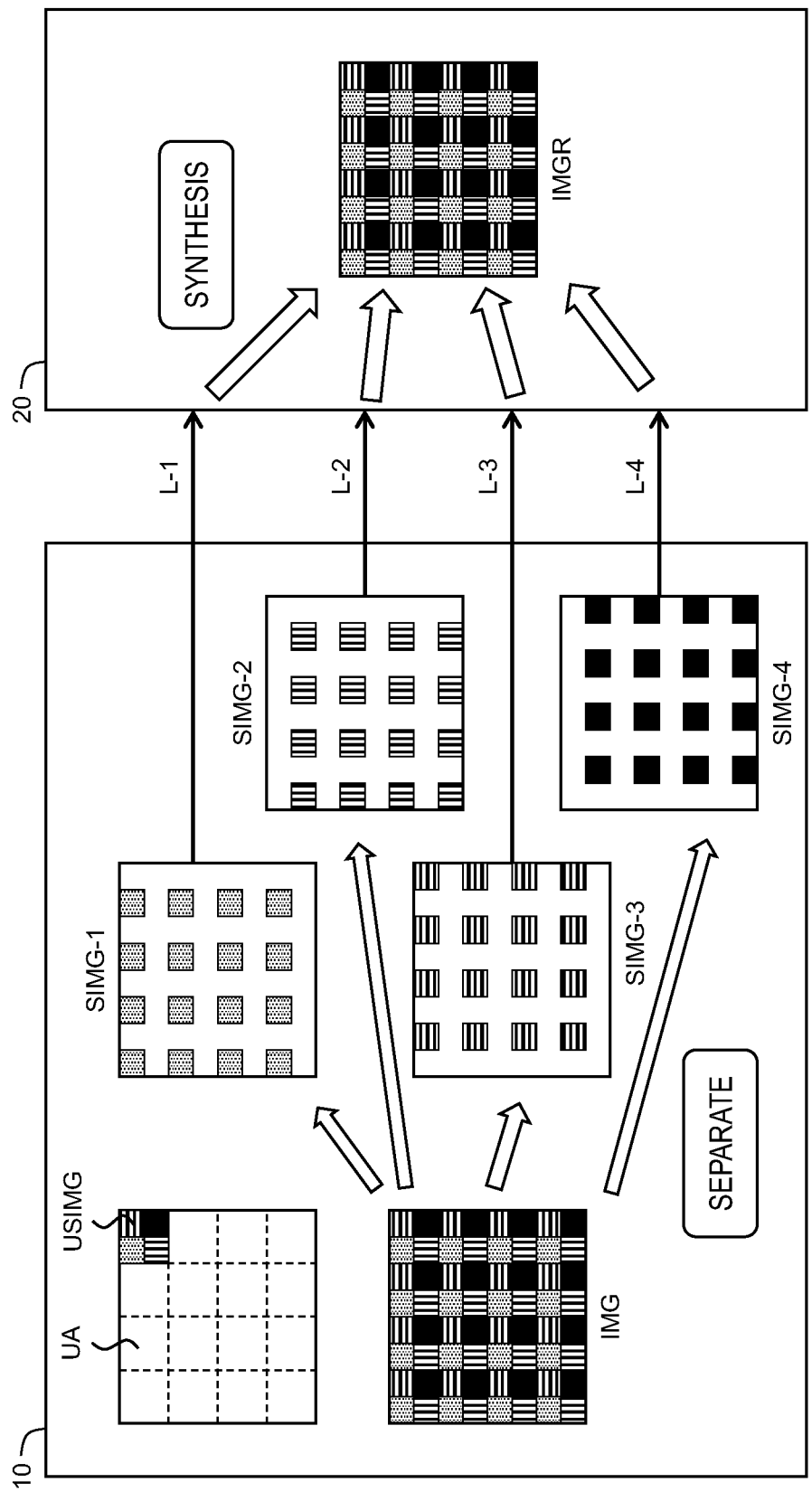
FIG. 2 is a conceptual diagram for explaining separate image transmission according to an embodiment.

FIG. 2 is a conceptual diagram for explaining the separate image transmission according to the present embodiment. In the example shown in FIG. 2, N is 4. Hereinafter, processing with respect to an image IMG of one frame constituting the video will be described.

The first communication device 10 spatially separates (divides) the image IMG of one frame into N separate images SIMG-1 to SIMG-N. Conversely, when those N separate images SIMG-1 to SIMG-N are synthesized, the original image IMG is restored. The first communication device 10 gives identification information for each separate image SIMG-i (i=1 to N). The identification information includes a position of the separate image SIMG-i in the original image IMG.

In the example illustrated in FIG. 2, each separate image SIMG-i (i=1 to N) is dispersed in a wide range without being biased in the original image IMG. In order to achieve such the dispersed separate image SIMG-i, the first communication device 10 may partition the image IMG into a plurality of unit areas UA having a matrix shape and perform an image separation process for each unit area UA. In this case, the first communication device 10 spatially separates each unit area UA into first to N-th unit separate images USIMG-1 to USIMG-N. Then, the first communication device 10 generates a set of i-th unit separate images USIMG-i in the plurality of unit areas UA as the i-th separate image SIMG-i.

The separate images SIMG-1 to SIMG-N may be uniformly distributed in the image IMG. The separate images SIMG-1 to SIMG-N may have the same arrangement pattern except for the position.

The first communication device 10 allocates the N separate images SIMG-1 to SIMG-N thus generated to the N communication lines L-1 to L-N, respectively. That is to say, the first communication device 10 allocates the separate image SIMG-i to the communication line L-i. Then, the first communication device 10 transmits the N separate images SIMG-1 to SIMG-N to the second communication device 20 in parallel via the N communication lines L-1 to L-N, respectively.

The second communication device 20 receives one or more separate images SIMG via the N communication lines L-1 to L-N within a reception period for the one frame. Then, the second communication device 20 generates a restored image IMGR by synthesizing the received one or more separate images SIMG. At this time, the second communication device 20 grasps the position of the separate image SIMG-i in the original image IMG based on the identification information included in the received separate image SIMG-i. The position of the separate image SIMG-i in the original image IMG is used as it is as the position of the separate image SIMG-i in the restored image IMGR.

In the example illustrated in FIG. 2, all of the four communication lines L-1 to L-4 are normal, and no communication abnormality such as communication blackout occurs. The second communication device 20 receives the four separate images SIMG-1 to SIMG-4 in parallel via the four communication lines L-1 to L-4, respectively, within the reception period for the one frame. Then, the second communication device 20 generates the restored image IMGR by synthesizing the received four separate images SIMG-1 to SIMG-4. The restored image IMGR is consistent with the original image IMG. The restored image IMGR is displayed on, for example, a display device.

Figure 3:
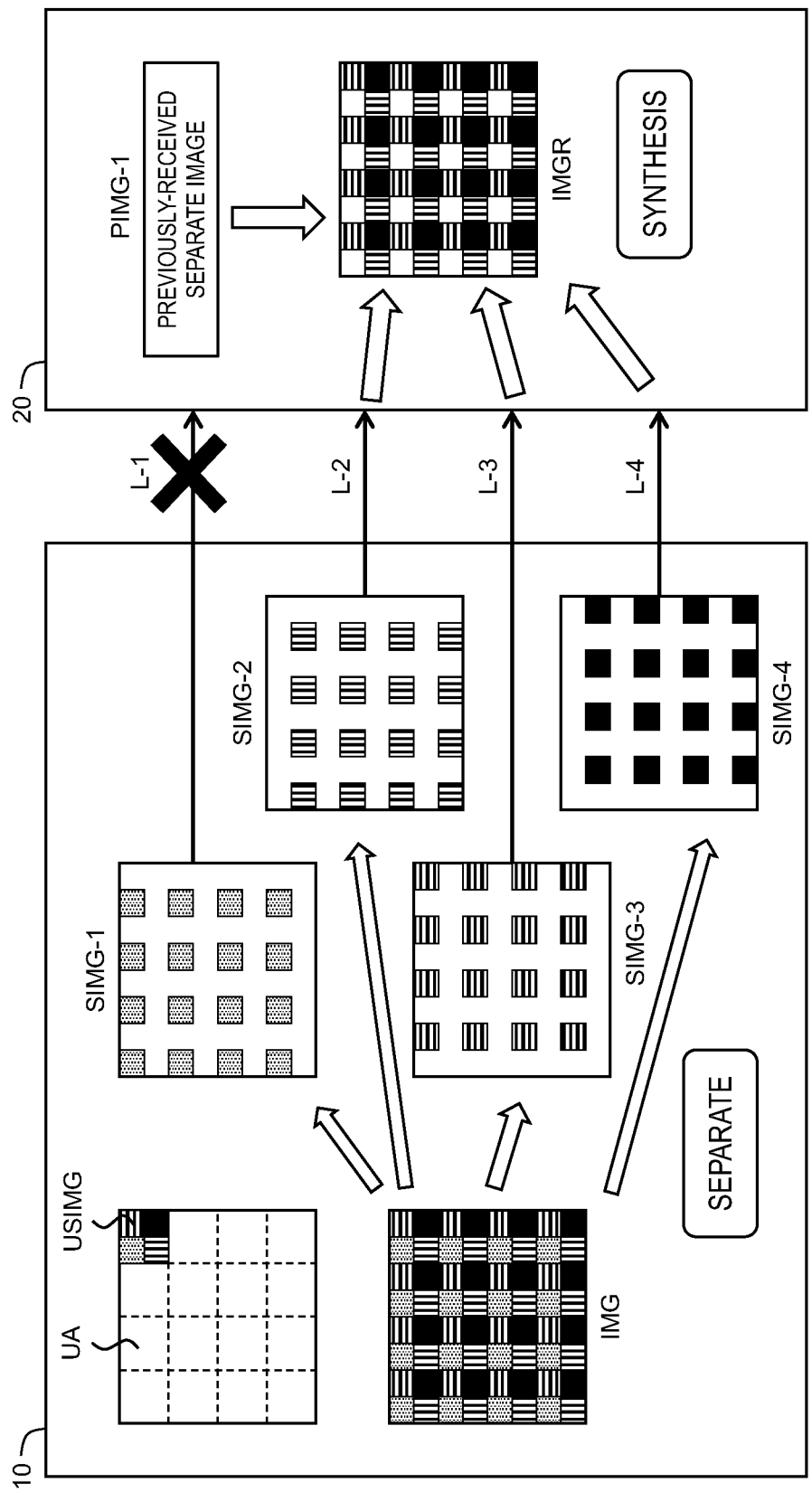
FIG. 3 is a conceptual diagram for explaining separate image transmission according to an embodiment.

FIG. 3 illustrates a case where a communication abnormality such as communication blackout occurs in a part of the communication lines L. For example, a communication abnormality occurs in the communication line L-1 for transmitting the separate image SIMG-1. The second communication device 20 receives the separate images SIMG-2 to SIMG-4 via the communication lines L-2 to L-4, respectively, but does not receive the separate image SIMG-1 from the communication line L-1 within the reception period for the one frame. For convenience, the separate image SIMG-i received within the reception period for the one frame is hereinafter referred to as a received separate image RIMG-i. The second communication device 20 generates the restored image IMGR by synthesizing at least the received separate images RMG-2 to RIMG-4.

Regarding the separate image SIMG-1 not received within the reception period for the one frame, a separate image PIMG-1 previously received from the communication line L-1 may be used as a substitute. In this case, the second communication device 20 generates the restored image IMGR by synthesizing the received separate images RIMG-2 to RIMG-4 and the previously-received separate image PIMG-1.

In the example shown in FIG. 3, the restored image IMGR is not fully consistent with the original image IMG. However, the restored image IMGR is consistent with the original image IMG at least in the portions of the received separate images RIMG-2 to RIMG-4. Even when such the restored image IMGR is displayed on the display device, the restored image IMGR is not so inferior. It can be said that the original image IMG is sufficiently reproduced to the extent that no problem arises in image recognition.

What is important is that the entire image IMG is not fully lost but real-time image IMG, even though it may be partial, reaches the second communication device 20. That is, the separate image transmission according to the present embodiment makes it possible to ensures continuity and real-time property of the video on the reception-side. This is preferable from the viewpoint of utilization of the video on the reception-side.

Furthermore, according to the present embodiment, the original image IMG is separated into the N separate images SIMG-1 to SIMG-N, and the N separate images SIMG-1 to SIMG-N are transmitted via the N communication lines L-1 to L-N, respectively. Unlike the above-described comparative example (i.e., redundant image transmission), no same image IMG is transmitted via the N communication lines L-1 to L-N. Therefore, no duplicated image IMG is discarded in the second communication device 20 on the reception-side. In other words, there is no image transmission that results in wasteful. As compared with the case of the redundant image transmission, the amount of transmission data is greatly reduced and thus the communication cost is also greatly reduced.

As described above, the separate image transmission according to the present embodiment makes it possible to ensure the continuity and the real-time property of the video on the reception-side while suppressing the communication cost.

As illustrated in the examples of FIGS. 2 and 3, the image IMG may be separated into a plurality of unit areas UA in a matrix form, and the image separation process may be performed for each unit area UA. In this case, each separate image SIMG-i is dispersed in a wide range without being biased in the image IMG. Therefore, even if there is no received separate image RIMG-i from a part of the communication lines L-i, appearance of the restored image IMGR becomes closer to the original image IMG. That is, appearance reproducibility of the restored image IMGR becomes higher. From this point of view, the separate images SIMG-1 to SIMG-N may be uniformly distributed in the image IMG. The separate images SIMG-1 to SIMG-N may have the same arrangement pattern except for the position.

Respective data amounts (areas) of the separate images SIMG-1 to SIMG-N may not be the same. For example, respective data amounts (areas) of the separate images SIMG-1 to SIMG-N may be set based on the communication qualities of the communication lines L1 to LN. In other words, a separation ratio of the separate images SIMG-1 to SIMG-N may be set according to the communication qualities of the communication lines L-1 to L-N. Examples of the communication quality include a communication speed (throughput), a latency, a jitter, and the like. In this case, the image separation process is performed such that the data amount of the separate image SIMG-i allocated to the communication line L-i having higher communication quality becomes larger. Considering the communication quality (performance) of each communication line L as described above makes it possible to perform the separate image transmission more efficiently.

This can be generalized as follows. The first communication device 10 separates the image IMG into the N separate images SIMG-1 to SIMG-N based on the communication quality of each of the N communication lines L-1 to L-N. Here, a first communication line L-a having relatively high communication quality and a second communication line L-b having relatively low communication quality are considered. A first separate image SIMG-a is a separate image SIMG allocated to the first communication line L-a, and a second separate image SIMG-b is a separate image SIMG allocated to the second communication line L-b. In this case, the data amount of the first separate image SIMG-a is larger than the data amount of the second separate image SIMG-b.

The first communication device 10 applies the above-described separate image transmission to at least a part of a plurality of images IMG (frames) constituting the video to be transmitted. Thereby, at least an effect can be obtained. The first communication device 10 may apply the above-described separate image transmission to all the images IMG (frames) constituting the video to be transmitted.

3. Configuration Example and Processing Example

Figure 4:
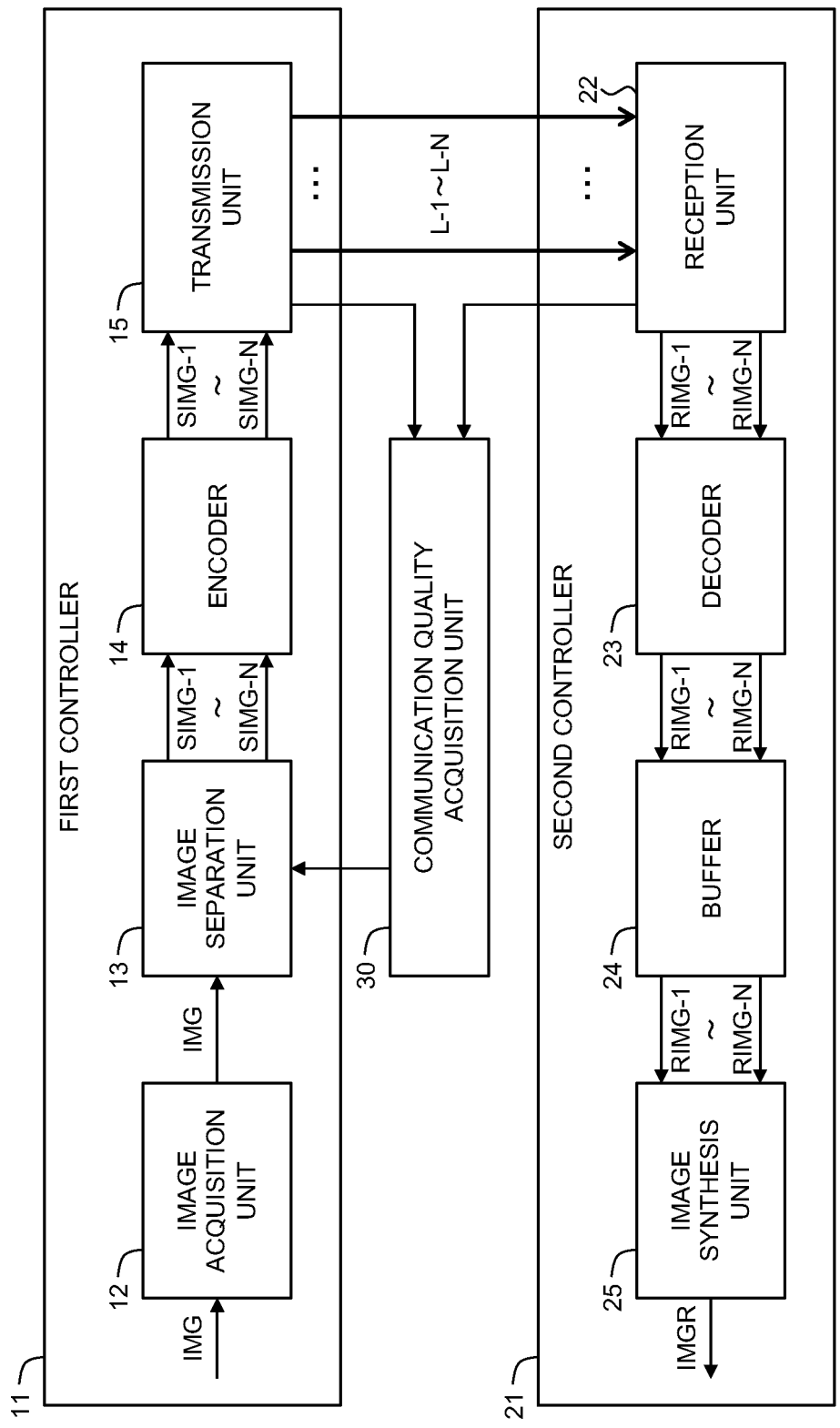
FIG. 4 is a block diagram showing a configuration example of a video transmission system according to an embodiment.

FIG. 4 is a block diagram illustrating a configuration example of the video transmission system 1 according to the present embodiment.

The first communication device 10 on the transmission-side includes a first controller 11. The first controller 11 includes an image acquisition unit 12, an image separation unit 13, an encoder 14, and a transmission unit 15 as functional blocks. The first controller 11 may be configured by a processor, a memory, a variety of circuits, a transceiver, and the like. The processor executes a variety of information processing. The memory stores a variety of information required for the processing executed by the processor. The processor may execute a computer program. The computer program may be recorded on a non-transitory computer-readable recording medium.

The second communication device 20 on the reception-side includes a second controller 21. The second controller 21 includes a reception unit 22, a decoder 23, a buffer 24, and an image synthesis unit 25 as functional blocks. The second controller 21 may be configured by a processor, a memory, a variety of circuits, a transceiver, and the like. The processor executes a variety of information processing. The memory stores a variety of information required for the processing executed by the processor. The processor may execute a computer program. The computer program may be recorded on a non-transitory computer-readable recording medium.

Figure 5:
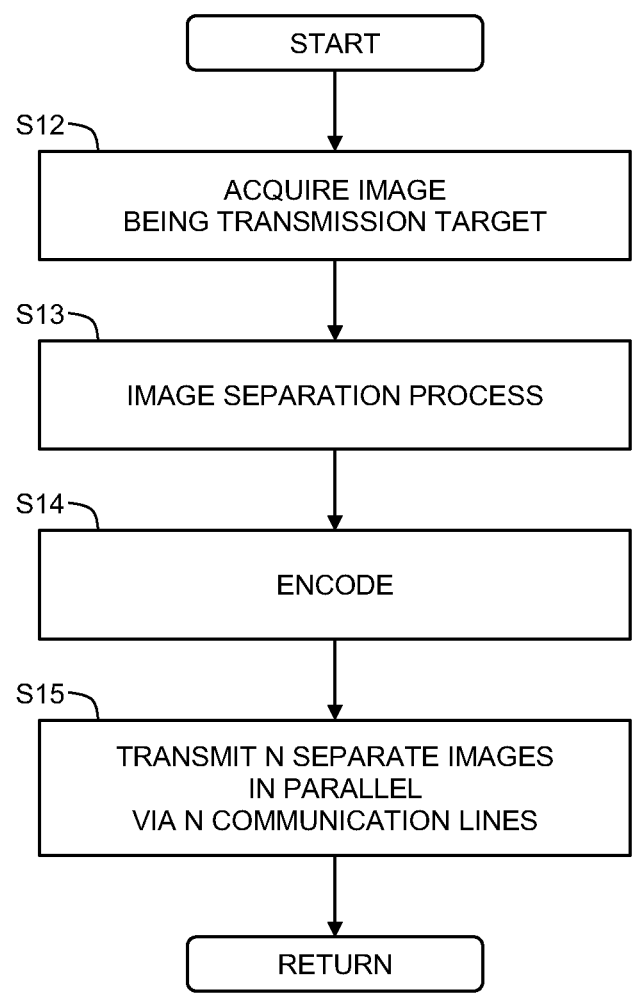
FIG. 5 is a flowchart showing an example of processing performed by a first communication device (transmission-side device) according to an embodiment.
Figure 6:
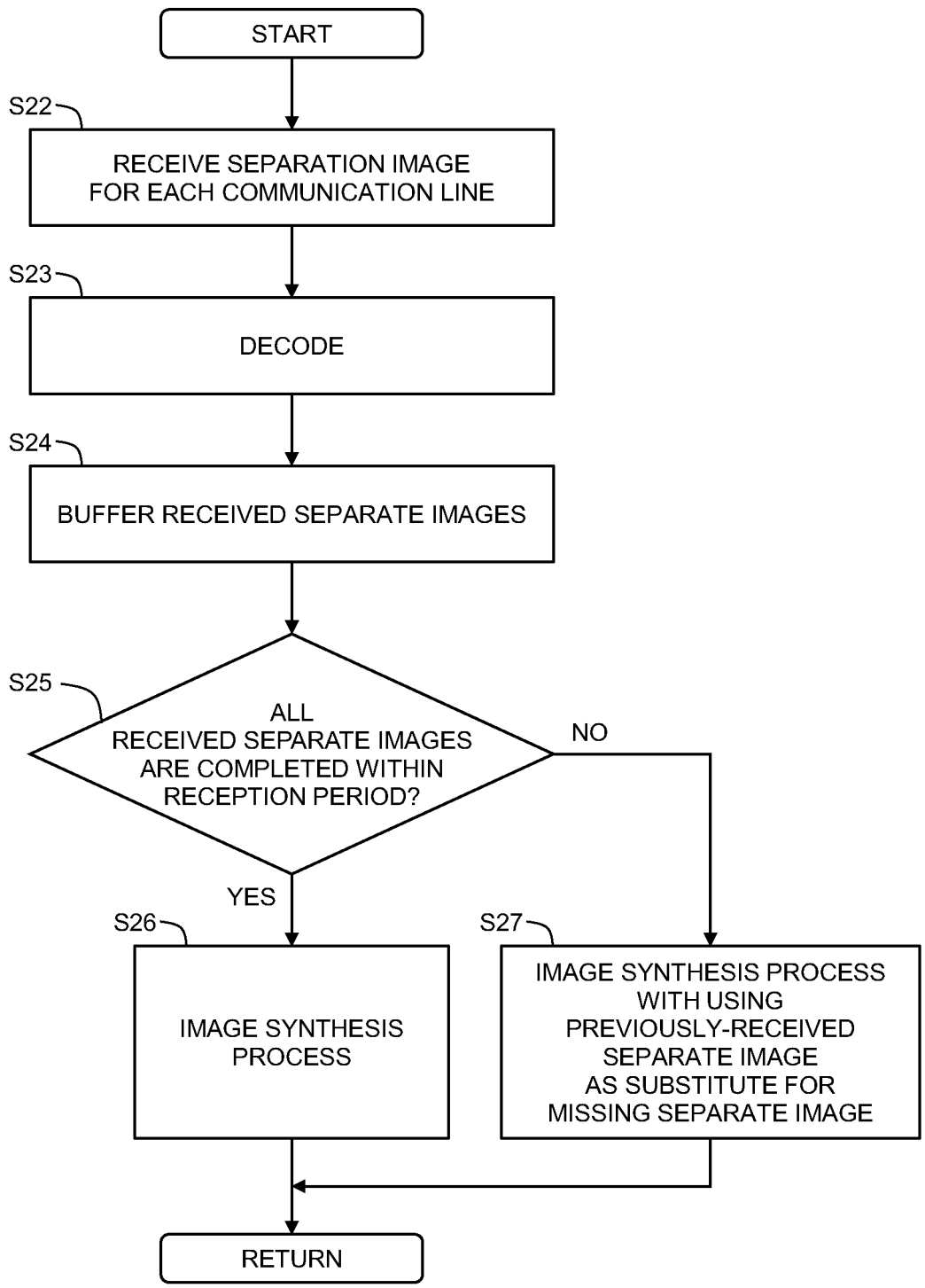
FIG. 6 is a flowchart showing an example of processing performed by a second communication device (reception-side device) according to an embodiment.

FIG. 5 is a flowchart illustrating an example of processing performed by the first communication device 10 on the transmission-side. FIG. 6 is a flowchart illustrating an example of processing performed by the second communication device 20 on the reception-side.

In Step S12, the image acquisition unit 12 acquires the image IMG for each frame included in the video to be transmitted.

In Step S13, the image separation unit 13 performs the image separation process that spatially separates the image IMG of one frame into N separate images SIMG-1 to SIMG-N. This image separation process is as described in the above Section 2. The image separation unit 13 may partition the image IMG into a plurality of unit areas UA having a matrix shape and perform the image separation process for each unit area UA. In this case, each separate image SIMG-i is dispersed in a wide range without being locally biased in the image IMG.

In Step S14, the encoder 14 encodes the separate images SIMG-1 to SIMG-N. The encoder 14 may include N encoders and may encode the N separate images SIMG-1 to SIMG-N in parallel.

In Step S15, the transmission unit 15 transmits the encoded separate images SIMG-1 to SIMG-N to the second communication device 20 in parallel via the communication lines L-1 to L-N, respectively.

In Step S22, the reception unit 22 receives the separate images SIMG-1 to SIMG-N via the communication lines L-1 to L-N, respectively. The received separate image RIMG-i is a separate image SIMG-i received within a reception period for one frame.

In Step S23, the decoder 23 decodes the received separate image RIMG-i. The decoder 23 may include N decoders and may decode the N received separate images RIMG-1 to RIMG-N in parallel.

In Step S24, the buffer 24 stores the received separate image RIMG-i after decoding.

In Step S25, the image synthesis unit 25 determines whether or not all of the N received separate images RIMG-1 to RIMG-N are completed within the reception period for one frame. In a case where all of the N received separate images RIMG-1 to RIMG-N are completed (Step S25; Yes), the processing proceeds to Step S26. On the other hand, when there is no received separate image RIMG-m from a communication line L-m (Step S25; No), the processing proceeds to Step S27.

In Step S26, the image synthesis unit 25 generates the restored image IMGR by synthesizing the N received separate images RIMG-1 to RIMG-N. The restored image IMGR is displayed on, for example, a display device.

In Step S27, the image synthesis unit 25 acquires, from the buffer 24, a received separate image RIMG-m previously received from the communication line L-m. A previously-received separate image PIMG-m is the received separate image RIMG-m acquired from the buffer 24. Then, the image synthesis unit 25 generates the restored image IMGR by synthesizing the one or more received separate images RIMG-i and the previously-received separate image PIMG-m. The restored image IMGR is displayed on, for example, a display device.

4. Modification Example

As shown in FIG. 4, the video transmission system 1 may further include a communication quality acquisition unit 30.

The communication quality acquisition unit 30 acquires information on the communication quality of each of the communication lines L1 to LN. Examples of the communication quality include a communication speed (throughput), a latency, a jitter, and the like. The communication speed may be an actually measured value or a predicted value. For example, the communication quality acquisition unit 30 acquires the information on the communication quality of each communication line L based on at least one of the data transmission result from the transmission unit 15 and the data reception result in the reception unit 22. For example, the communication quality acquisition unit 30 is included in the first controller 11 on the transmission-side. In that case, the data reception result in the reception unit 22 may be fed back to the first controller 11. As another example, the communication quality acquisition unit 30 may be included in the second controller 21 on the reception-side.

The image separation unit 13 acquires the information on the communication quality of each communication line L from the communication quality acquisition unit 30. Then, the image separation unit 13 separates the image IMG into the N separate images SIMG-1 to SIMG-N based on the communication quality of each communication line L. For example, a first communication line L-a having relatively high communication quality and a second communication line L-b having relatively low communication quality are considered. A first separate image SIMG-a is a separate image SIMG allocated to the first communication line L-a, and a second separate image SIMG-b is a separate image SIMG allocated to the second communication line L-b. In this case, the data amount of the first separate image SIMG-a is larger than the data amount of the second separate image SIMG-b. That is, the separation ratio of the separate images SIMG-1 to SIMG-N is set in accordance with the communication quality. Accordingly, it is possible to more efficiently perform the separate image transmission.

What is claimed is:

1. A video transmission system for transmitting a video, comprising:
    a transmission-side device; and
    a reception-side device connected to the transmission-side device via N communication lines, N being an integer of 2 or more, wherein
    the transmission-side device is configured to:
        spatially separate an image of one frame into N separate images; and
        transmit the N separate images to the reception-side device in parallel via the N communication lines, respectively,
    the reception-side device is configured to generate a restored image by synthesizing one or more separate images received via the N communication lines within a reception period for the one frame,
    a received separate image is a separate image received by the reception-side device within the reception period for the one frame, and
    when there is no received separate image from a part of the N communication lines within the reception period for the one frame, the reception-side device is configured to generate the restored image by synthesizing the received separate image and a separate image previously received from the part of the N communication lines.

2. The video transmission system according to claim 1, wherein
    the N separate images include an i-th separate image, i is 1 to N, and the transmission-side device is further configured to:
partition the image of the one frame into a plurality of unit areas having a matrix shape;
spatially separate each of the plurality of unit areas into first to N-th unit separate images; and
generate a set of i-th unit separate images in the plurality of unit areas as the i-th separate image.

3. The video transmission system according to claim 1, wherein
the transmission-side device is further configured to separate the image of the one frame into the N separate images based on a communication quality of each of the N communication lines,
the N communication lines include a first communication line and a second communication line having the communication quality lower than that of the first communication line,
the N separate images include a first separate image allocated to the first communication line and a second separate image allocated to the second communication line, and
a data amount of the first separate image is larger than a data amount of the second separate image.

* * * * *